(12) United States Patent
Hush et al.

(10) Patent No.: US 11,893,283 B2
(45) Date of Patent: *Feb. 6, 2024

(54) ASYNCHRONOUS PROCESS TOPOLOGY IN A MEMORY DEVICE

(71) Applicant: Micron Technology, Inc., Boise, ID (US)

(72) Inventors: Glen E. Hush, Boise, ID (US); Richard C. Murphy, Boise, ID (US); Honglin Sun, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,595

(22) Filed: Jun. 27, 2022

(65) Prior Publication Data

US 2022/0326889 A1  Oct. 13, 2022

Related U.S. Application Data

(63) Continuation of application No. 16/866,740, filed on May 5, 2020, now Pat. No. 11,372,585.

(51) Int. Cl.
*G06F 1/12* (2006.01)
*G06F 3/06* (2006.01)

(52) U.S. Cl.
CPC ............ *G06F 3/0659* (2013.01); *G06F 1/12* (2013.01); *G06F 3/0604* (2013.01); *G06F 3/0673* (2013.01)

(58) Field of Classification Search
CPC .... G06F 3/0659; G06F 3/0604; G06F 3/0673; G06F 3/0688; G06F 3/061; G06F 1/12; Y02D 10/00
See application file for complete search history.

(56) References Cited

U.S. PATENT DOCUMENTS

| | | | |
|---|---|---|---|
| 5,050,095 A | | 9/1991 | Samad |
| 6,496,901 B1 * | | 12/2002 | De Martine .......... G06F 3/0604 711/134 |
| 7,043,466 B2 | | 5/2006 | Watanabe et al. |
| 7,712,111 B2 | | 5/2010 | Illowsky et al. |
| 9,477,623 B2 | | 10/2016 | Riocreux et al. |
| 2003/0172242 A1 * | | 9/2003 | Uneyama ................. G06F 5/14 711/167 |
| 2004/0073764 A1 | | 4/2004 | Andreasson |

(Continued)

FOREIGN PATENT DOCUMENTS

WO    2017-155781 A1    9/2017

OTHER PUBLICATIONS

International Search Report and Written Opinion from International Application Serial No. PCT/US2021/029553, dated Aug. 27, 2021, 11 pages.

*Primary Examiner* — Rocio Del Mar Perez-Velez
*Assistant Examiner* — Tong B. Vo
(74) *Attorney, Agent, or Firm* — Brooks, Cameron & Huebsch, PLLC

(57) ABSTRACT

Apparatuses and methods can be related to generating an asynchronous process topology in a memory device. The topology can be generated based on the results of a number of processes. The processes can be asynchronous given that the processing resources that implement the processes do not use a clock signal to generate the topology.

20 Claims, 6 Drawing Sheets

(56) References Cited

U.S. PATENT DOCUMENTS

| | | | |
|---|---|---|---|
| 2016/0098208 A1* | 4/2016 | Willcock | G06F 3/0673 |
| | | | 711/165 |
| 2017/0213581 A1 | 7/2017 | Kim et al. | |
| 2017/0255225 A1* | 9/2017 | Lilja | G06T 1/00 |
| 2018/0150125 A1* | 5/2018 | HomChaudhuri | G06F 13/4282 |
| 2018/0173499 A1 | 6/2018 | Tiwari | |
| 2018/0211694 A1 | 7/2018 | Kim | |
| 2018/0293463 A1 | 10/2018 | Brown | |
| 2019/0212769 A1* | 7/2019 | Carlough | G06F 1/10 |
| 2019/0334524 A1* | 10/2019 | Wuu | G11C 11/412 |
| 2020/0133990 A1* | 4/2020 | Mathuriya | G06F 17/16 |
| 2020/0174938 A1* | 6/2020 | Shergill | G06F 12/0871 |
| 2020/0387352 A1* | 12/2020 | Chawla | G06F 17/10 |
| 2021/0018969 A1* | 1/2021 | Srivastava | G06F 1/06 |
| 2021/0150318 A1* | 5/2021 | Kwak | G06N 3/063 |
| 2021/0173560 A1* | 6/2021 | Choi | G06F 3/0679 |
| 2021/0216243 A1* | 7/2021 | Shin | G06F 3/0659 |
| 2022/0027704 A1* | 1/2022 | Glesner | G06N 20/10 |

\* cited by examiner

ASYNCHRONOUS PROCESS TOPOLOGY IN A MEMORY DEVICE

PRIORITY INFORMATION

This application is a continuation of U.S. application Ser. No. 16/866,740, filed on May 5, 2020, the contents of which are incorporated herein by reference.

TECHNICAL FIELD

The present disclosure relates generally to memory, and more particularly to apparatuses and methods associated with implementing an asynchronous process topology in a memory device.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

The memory may be provided command utilizing an interface protocol. The commands provided to the memory may be predefined and may be used to control the function of the memory. The interface may be utilized to provide commands to the memory device to cause the memory device to perform operations.

DETAILED DESCRIPTION

Figure 1:
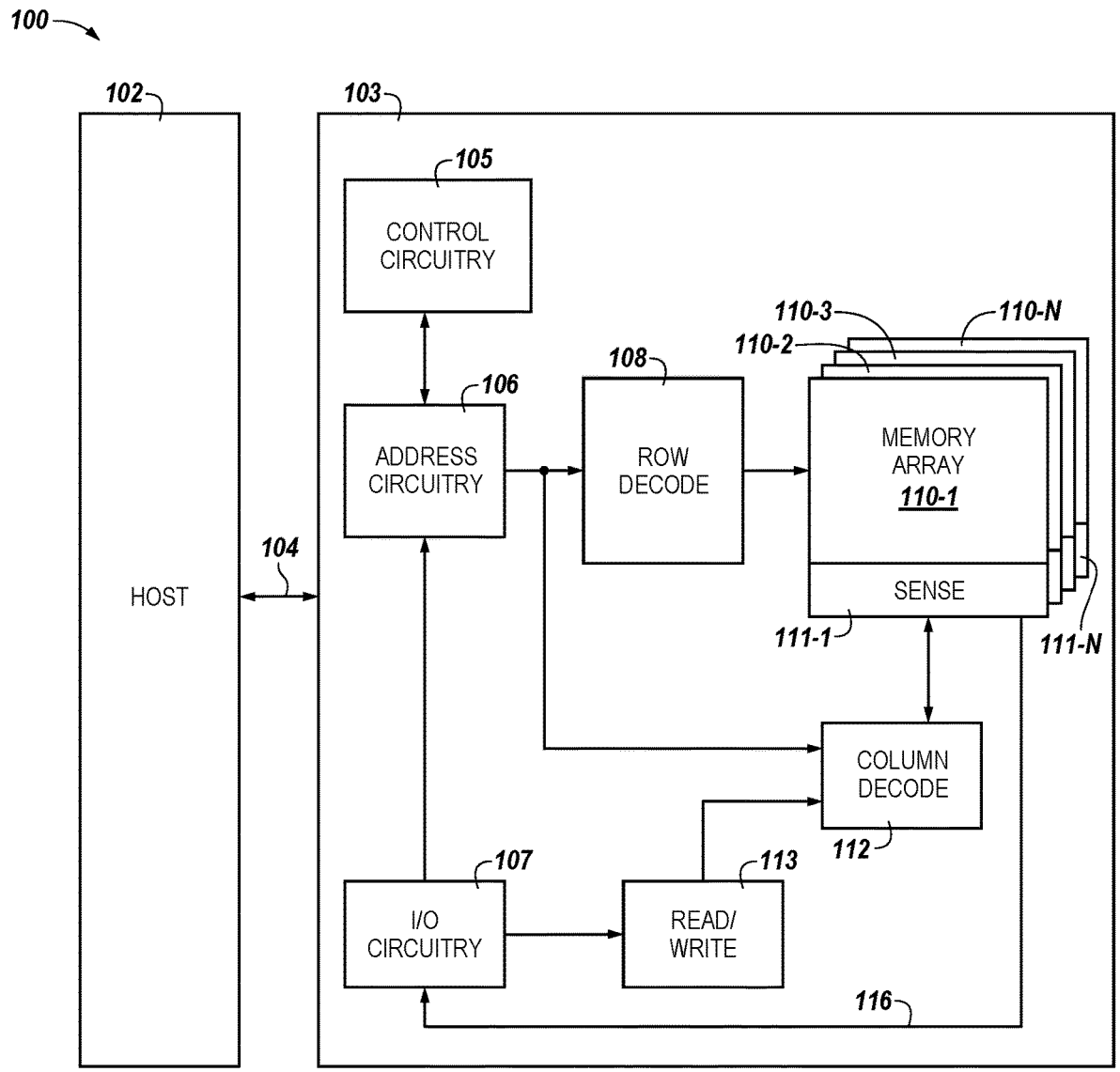
FIG. 1 is a block diagram of an apparatus in the form of a computing system including a memory device in accordance with a number of embodiments of the present disclosure.

The present disclosure includes apparatuses and methods related to implementing an asynchronous process topology in a memory device. A memory device can receive clock signals and/or can generate clock signals. The clock signals can be used to synchronize various operations performed by the memory device. The various operations performed by the memory device can be performed synchronously within the memory device and/or can be performed synchronously with a device, such as a host device, external to the memory device. In various examples, a memory device can implement processes and/or a topology corresponding to the processes asynchronously.

As used herein, "synchronous" refers to the use of a clock signal in performing operations and/or processes. A clock signal includes any timing signal or a signal that can be used to track duration of time, a time reference, and/or reference of operations. In various examples, the clock signal can be received from a host device. Asynchronous refers to the performance of operations and/or processes without the use of the clock signal.

The memory device can be configured to implement the processes and/or the topology corresponding thereto asynchronously while in a non-compliant mode. The memory device may not be configurable to implement the processes and/or the topology corresponding thereto asynchronously while in a compliant mode.

A memory device can be compliant to an interface protocol. The interface protocol is defined as the communication between a memory device and a device external to the memory device. Devices can be compliant to an interface protocol if they communicate as defined by the interface protocol. The interface protocol can be defined such that a memory device can receive and process signals from a plurality of devices external to the memory device, where the plurality of devices are manufactured by a plurality of different providers. An example of an interface protocol is the double data rate (DDR) 5 standard. In various instances, the interface protocol can be generated by an organization such as the joint electron device engineering council (JEDEC) that enables any devices compliant with the interface protocol to communicate with each other without the added expense of defining a new interface protocol for multiple devices.

In various examples, the result of a process implemented in a memory device can be used to select a different process for execution. The processes can be performed asynchronously and/or the selection of the different process can be performed asynchronously. Performing asynchronous processes and/or selecting processes asynchronously in a synchronous memory device provides the ability to implement processes that would otherwise not be implementable in a memory device. For example, performing asynchronous processes and/or selecting processes asynchronously in a synchronous memory device provides the ability to implement learning processes in the memory device. Learning processes can include neural networks among other types of learning processes. Although the examples provided herein are provided in the context of neural networks, the examples can also be implemented utilizing different types of processes.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 103 in accordance with a number of embodiments of the present disclosure. As used herein, a memory device 103, memory arrays 110-1, 110-2, 110-3, . . . , and 110-N, and/or a host 102, for example, might also be separately considered an "apparatus." The memory arrays 110-1, 110-2, 110-3, . . . , and 110-N can be referred to as memory arrays 110.

In this example, system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry) capable of accessing memory 102. The system 100 can include separate integrated circuits, or both the host 102 and the memory device 103 can be on the same integrated circuit. For example, the host 102 may be a system controller of a memory system comprising multiple memory devices 103, with the system controller 102 providing access to the respective memory devices 103 by another processing resource such as a central processing unit (CPU).

In the example shown in FIG. 1, the host 102 is responsible for executing an operating system (OS) and/or various applications that can be loaded thereto (e.g., from memory device 103 via controller 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the system 100 has been simplified to focus on features with particular relevance to the present disclosure. The memory arrays 110 can be a DRAM array, SRAM array, STT RAM array, PCRAM array, TRAM array, RRAM array, NAND flash array, and/or NOR flash array, for instance. The arrays 110 can comprise memory cells arranged in rows coupled by access lines (which may be referred to herein as word lines or select lines) and columns coupled by sense lines (which may be referred to herein as digit lines or data lines).

The memory device 103 includes address circuitry 106 to latch address signals provided over an interface 104. The interface can include, for example, a physical interface employing a suitable protocol (e.g., a data bus, an address bus, and a command bus, or a combined data/address/command bus). Such protocol may be custom or proprietary, or the interface 104 may employ a standardized protocol, such as Peripheral Component Interconnect Express (PCIe), Gen-Z interconnect, cache coherent interconnect for accelerators (CCIX), or the like. Address signals are received and decoded by a row decoder 108 and a column decoder 112 to access the memory arrays 110. Data can be read from memory arrays 110 by sensing voltage and/or current changes on the sense lines using sensing circuitry 111-1 to 111-N. The sensing circuitry 111-1 to 111-N can be referred to as sensing circuitry 111. Each of the sensing circuitry 111-1 to 111-N can be coupled to a corresponding memory array from the memory arrays 110-1, 110-2, 110-3, . . . , 110-N. Each memory array and corresponding sensing circuitry can constitute a bank of the memory device 103. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory arrays 110 or read data from the memory arrays 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory arrays 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory arrays 110 and/or from the memory array via the data lines 116.

In various instances, the functionality of the memory device 103 can be controlled by the host 102. For examples, the host 102 can provide commands to the memory device 103 through the interface 104 to read the memory arrays 110 and/or write to the memory arrays 110, among other functionalities of the memory array 103. However, an interface protocol implemented may not define commands to control the functionality of processing resources implemented in the memory device 103 to perform operations while in a compliant mode. The memory device can be configured to receive commands to control the functionality of processing resources while in a non-compliant mode.

The processing resources implemented in the memory device 103 can be coupled to the data lines 116, can be implemented in the sensing circuitry 111, and/or can be implemented under the memory arrays 110. The processing resources can be controlled to perform a process. As used herein, a process can comprise one or more operations performed by a processing resource. The operations can include logical operations such as AND operations and OR operations, among other types of logical operations. The operations can include addition operations, subtraction operations, multiplication operations, and/or division operations. Operations can also include comparison operations and selection operations.

In various examples, a result of a first process can be used to select a next process to perform and/or can be used to provide data to the host 102. The topology of the processes can be selected based on the results of the processes. In some examples, the coupling of the processing resources that implement the processes can correspond to the topology of the processes and can be based on the results of the processes.

Figure 2:
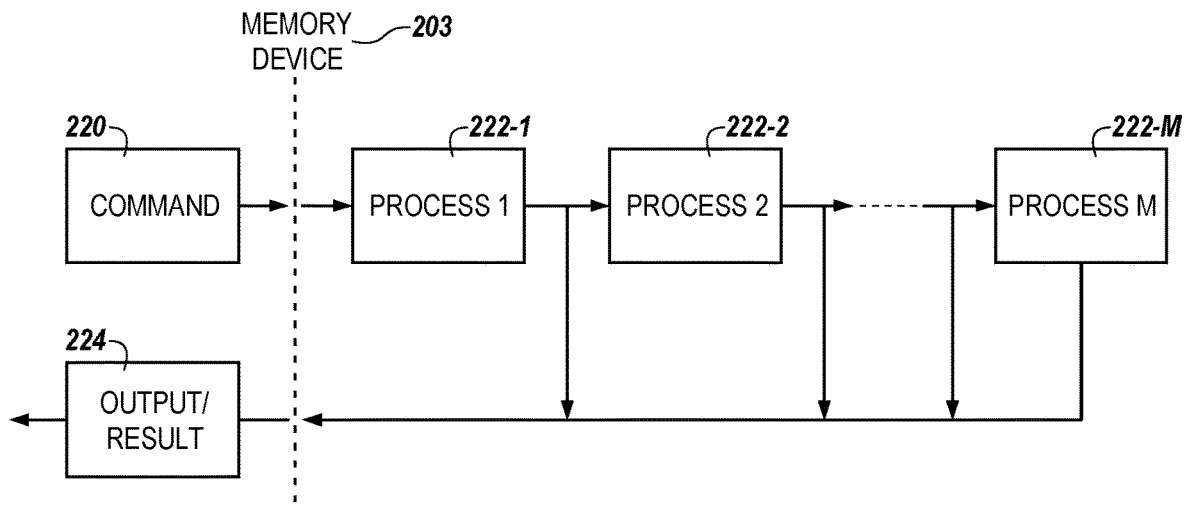
FIG. 2 is a block diagram of a plurality of processes in accordance with a number of embodiments of the present disclosure.

FIG. 2 is a block diagram of a plurality of processes 222-1, 222-2, . . . , and 222-M in accordance with a number of embodiments of the present disclosure. The processes 222-1, 222-2, . . . , and 222-M can be referred to as processes 222. The processes can be performed by a memory device 203. Each of the processes 222 can be executed by one or more processing resources hosted by the memory device 203.

The memory device 203 can receive a command 220 via an interface of the memory device 203. The command 220 can identify a process 222-1 to perform. A first number of processing resources can perform the process 222-1 responsive to receipt of the command. The memory device 203 can utilize the result of the process 222-1 to determine whether to perform the process 222-2 or to provide a result 224 (e.g., output/result 224). The determination can be performed by the first number of processing resources, a different number of processing resources, and/or by a comparator, among other types of circuitry that can initiate the process 222-2 or provide the data. The determination whether to perform the process 222-2 or provide the result 224 can be performed asynchronously. For example, the circuitry performing the determination can perform the determination without reference to a clock signal. The quantity of operations used to perform the determination can be performed without the use of a clock signal.

In various example, the process 222-1 and/or a portion of the process 222-1 can be performed without reference to a clock signal. For example, although a read operation corresponding to the process 222-1 may be implemented based on a clock signal, different operations corresponding to the process 222-1 may be performed without reference to a clock signal.

The result of the process 222-1 may be used to select the process 222-2, as shown in the example of FIG. 2. Although, in different examples, the result of the process 222-1 could be used to select the process 222-3 (e.g., not shown) and/or a different process.

The result of the process 222-2 can be used to select the process 222-3. The result of the process 222-2 can also be used to determine whether to provide the result to a host. In some examples, a result of a process can be used to determine whether to provide the result without the selection of a next process. The result of the process 222-M can be used to determine that no additional processes should be selected and that the result is to be provided to the host.

Although FIG. 2 shows the result 224 as being provided by the memory device 203 to a device external to the memory device 203, the result 224 can be stored in a memory array of the memory device 203. A host can thereto read the result from the memory array. For example, a command used to initiate the process 222-1 can also be associated with a location in the memory array such that the result corresponding to the process 222-1 is stored in memory cells, having an address associated with the command, of the memory array.

Figure 3:
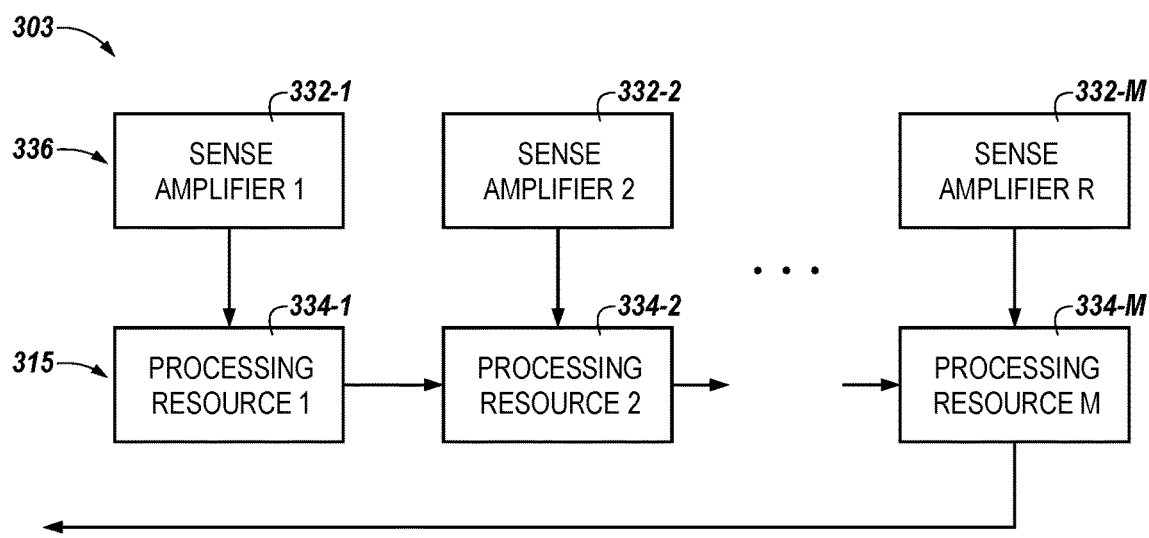
FIG. 3 is a block diagram of an apparatus in the form of a memory device including a plurality of processing resources in accordance with a number of embodiments of the present disclosure.

FIG. 3 is a block diagram of an apparatus in the form of a memory device 303 including a plurality of processing resources 334-1, 334-2, . . . , and 334-M in accordance with a number of embodiments of the present disclosure. The processing resources 334-1, 334-2, . . . , and 334-M can be referred to as processing resources 334.

The processing resources 334-1 can be implemented under a memory array (e.g., memory array 110-1). In various examples, the sense amplifiers 332-1, 332-2, . . . , and 332-M can also be implemented under the memory array. The sense amplifiers 332-1, 332-2, . . . , and 332-M can be referred to as sense amplifiers 332. In different examples, the sense amplifiers 332 can be implemented in line with the memory array as opposed to being implemented under the memory array. Regardless of whether the sense amplifiers 332 are implemented under the memory array or not, the sense amplifiers 332 are coupled to the processing resources 334. For example, the sense amplifier 332-1 is coupled to the processing resource 334-1, the sense amplifier 332-2 is coupled to the processing resource 334-2, . . . , and the sense amplifier 332-M is coupled to the processing resource 334-M.

The sense amplifiers 332 can be coupled to sense lines of the memory array. The sense amplifiers 332 can amplify a signal provided from the memory cells of the memory array through the sense lines. The sense amplifiers 332 can provide a signal to the processing resources 334. The processing resource 334 can perform a plurality of operations on data provided from the sense amplifiers 332.

The result of a first process implemented by the processing resource 334-1 can be used to provide the result to the processing resource 334-2. The processing resource 334-2 can utilize data provided by the sense amplifier 332-2 and/or the processing resource 334-2 to perform a second process that when implemented generates a second result. The second result can be used to determine whether or not to initiate a next process implemented by a processing resource 334-3 (not shown). The processing resource 334-M can utilize a result of a prior process and/or data provided by the sense amplifier 332-M to implement a last process. The result of the last process can be provided through a plurality of I/O lines.

Although a sense amplifier is shown as being coupled to a processing resource, multiple processing resources can be coupled to a sense amplifier and/or multiple sense amplifiers can be coupled to a processing resource. The coupling of sense amplifiers 332 to processing resources 334 can be used to provide data to the processing resources 334.

In various examples, the processing resources 334 may not be coupled to clock signals such that the processes implemented by the processing resources 334 are performed asynchronously. In various examples, the portion of the processing resources 334 that determines whether to provide data to a processing resource may not utilize a clock signal to perform the determination while a remainder of the processing resources 334 may utilize a clock signal to perform different operations. The portion of the processing resources 334 that determines which processing resource to provide data to may not utilize a clock signal to perform the determination while a remainder of the processing resources 334 may utilize a clock signal to perform different operations.

In various examples, the memory device 303 can be a three-dimensional (3D) memory device which includes multiple layers stacked together. As an example, a first layer 336 (e.g., memory array 110-1 as illustrated in FIG. 1) of the memory device 303 is coupled to a second layer 315 (e.g., CMOS under array as illustrated in FIG. 3) of the memory device 303. Although the first layer 336 is described as being on the second layer 315, the first layer 336 and the second layer 315 can be designed to comprise a number of different orientations such that the first layer 336 is coupled to the second layer 315. The examples described herein are not limited to a specific orientation between the first layer 336 and the second layer 325. The first layer 336 of the memory device 303 can include an array of memory cells. Although embodiments are not so limited, memory cells of the array can include DRAM memory cells.

The second layer 315 can include a number of logic blocks that are configured to perform various functions, for example, using data values stored in the array of memory cells. The number of logic blocks can include a plurality of processing resources 334 which can also be referred to as a processing resource 334. In various examples, the second layer can also include row drivers and/or column drivers. Although the M quantity of processing resources 334 are shown in FIG. 3, the processing resources 334 can include more or fewer processing resources than those shown here.

The second layer 315 may be one of a plurality of logic blocks included within the memory device 303. The processing resources 334 can be configured to perform artificial intelligence (AI) processing. For example, the processing resources 334 can be configured as a network (e.g., neural network). Each of the processing resources 332 can be a node in a neural network. Each of the processing resources 334 can be coupled to different memory cells of a memory array which can store weights of the network and/or inputs to the network. The processing resources 334 can be interconnected such that the outputs of some of the processing resources 334 can be received as input by another of the processing resources 334. A result of the AI processing performed by the processing resources 334 can be stored back to the memory array, can be latched by sense amplifiers, and/or can be provided via I/O lines. As used herein, references to networks or learning processes can refer to artificial networks and learning processes.

Figure 4:
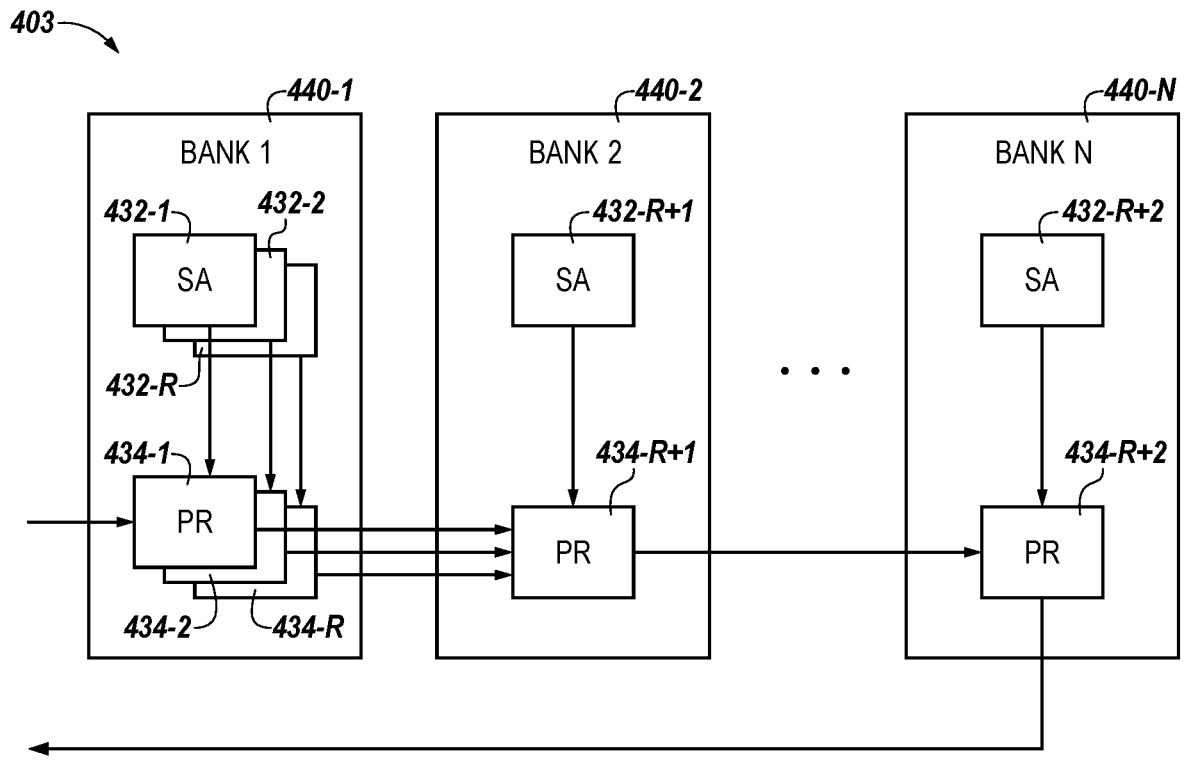
FIG. 4 is a block diagram of an apparatus in the form of a memory device including a plurality of banks in accordance with a number of embodiments of the present disclosure.

FIG. 4 is a block diagram of an apparatus in the form of a memory device 403 including a plurality of banks 440-1, 440-2, . . . , 440-N in accordance with a number of embodiments of the present disclosure. The banks 440-1, 440-3, . . . , 440-N can be referred to as banks 440.

Each of the banks can include a plurality of sense amplifiers and processing resources. For example, the bank 440-1 includes sense amplifiers 432-1, 432-2, . . . , and 432-R, and processing resources 434-1, 434-2, . . . , and 434-R. The bank 440-2 is shown as including a sense amplifier 432-R+1 and a processing resource 434-R+1. The bank 440-N includes the sense amplifier 432-R+2 and processing resource 432-R+2. Although each of the banks 440-2 and 440-N are shown as including a single sense amplifier and a single processing resource, the banks 440-2 and 440-N can include more sense amplifiers and processing resources than those shown in FIG. 4. The sense amplifiers 432-1, 432-2, . . . , 432-R, 432-R+1, and 432-R+2 can be referred to as sense amplifiers 432. The processing resources 434-1, 434-2, . . . , 434-R, 434-R+1, and 434-R+2 can be referred to as processing resources 434.

The banks 440 can be configured to function as a single artificial neural network or as a plurality of artificial neural networks. For instance, the processing resources 434-1, 434-2, . . . , and 434-R of the bank 440-1 can be configured as a first neural network, the processing resources, including the processing resource 434-R+1, of the bank 440-2 can be configured as a second neural network, . . . , and the processing resources, including the processing resource 432-R+2, of the bank 440-N can be configured into an Nth neural network. In such examples, a process can be defined as the execution of a neural network. A first process can be performed by activating a first neural network. The result of the first neural network can be provided to a second neural network etc.

In a number of examples, each of the banks 440 of the memory device 403 can represent a single layer of a neural network such that a single neural network is implemented comprising N layers. A first layer of a neural network can be represented by the configuring of the processing resources 434-1, 434-2, . . . , and 434-R. A second layer of the neural network can be represented by the configuring of the processing resources, including the processing resource 434-R+1, in the bank 440-2. While an Nth layer of the neural network can be represented by the configuring of the processing resources, including the processing resource 434-R+2, in the bank 440-N.

Each of the processing resources 434 can be coupled to a different sense amplifier of the sense amplifiers 432. FIG. 4 shows the processing resources of a layer being coupled to processing resources of a different layer of a neural network. For example, the processing resources 434-1, 434-2, . . . , and 434-R are coupled to a processing resource 434-R+1 of the bank 440-2. Although not shown, each of the processing resources 434-1, 434-2, . . . , and 434-R can be coupled to each of the processing resources of the bank 440-2, each of the processing resources of the bank 440-2 can be coupled to each of the processing resources of a different bank, etc.

A process can include the propagation of signals through a layer of a neural network. The results of a first process including the results the first layer of the neural network can be provided to a second process by providing the results to the second layer of the neural network.

The topology of the neural network can be selected based on the results of the processes. A topology can describe how data is transferred between processing resources. For example, a first processing resource can be coupled to a second processing resource and a third processing resource. Data can be provided from the first processing resource to the second processing resource responsive to a first result of a first process executed by the first processing resource. Data can also be provided from the first processing resource to the third processing resource responsive to a second result of the first process. The passing of data between the first processing resource and the second processing resource can describe a first topology. The passing of data between the first processing resource and the third processing resource can describe a second topology. A topology can also describe an order in which processes executed by the processing resources are executed. For example, the first result of the first process can cause a second process executed by the second processing resource to be executed after the execution of the first process. A second result of the first process can cause a third process executed by the third processing resource to be executed after the execution of the first process. The execution of the second process after the execution of the first process can describe a first topology of the processes while the execution of the third process after the execution of the first process can describe a second topology of the processes.

The topology between the processes of the bank 440-1 and the bank 440-2 can be defined based on the results of the processing resources 434-1, 434-2, . . . , 434-R. Each of the processing resources 434-1, 434-2, . . . , and 434-R can be selectively coupled to the processing resource of the bank 440-2 based on the results provided by the processing resources 434-1, 434-2, . . . , and 434-R. The processing resources 434-1 can be selectively coupled to the processing resource 434-R+1 if the result provided by the processing resource 434-1 is greater than a threshold. If the result provided by the processing resource 434-1 is not greater than the threshold, then the processing resource 434-1 may not be coupled to the processing resource 434-R+1. As used herein, selectively coupling describes selectively providing data to a processing resource based on the results of a process.

The processing resources 434 may utilize inputs and weights stored in the memory array to perform a process which generates a result. Accordingly, the processing resources 434 can be configured to cause the use of different processing resources 434, operation of different sense amplifiers 432, and/or reading of memory cells coupled to the processing resources 434. For example, each of the processing resource 434 can cause the memory cells to be read by corresponding sensing circuitry from the sensing circuitry 432, the sensing circuitry 432 to provide signals to the different processing resources 434, and the different processing resources 434 to receive signals from corresponding processing resources 434. In various examples, a plurality of processing resources 434-1, 434-2, . . . , 434-R can cause memory cells to be read by the sensing circuitry 432-R+1, the sensing circuitry 432-R+1 to provide signals to the processing resource 434-R+1, and the processing resource 434-R+1 to receive signals from the processing resources 434-1, 434-2, . . . , 434-R.

Figure 5:
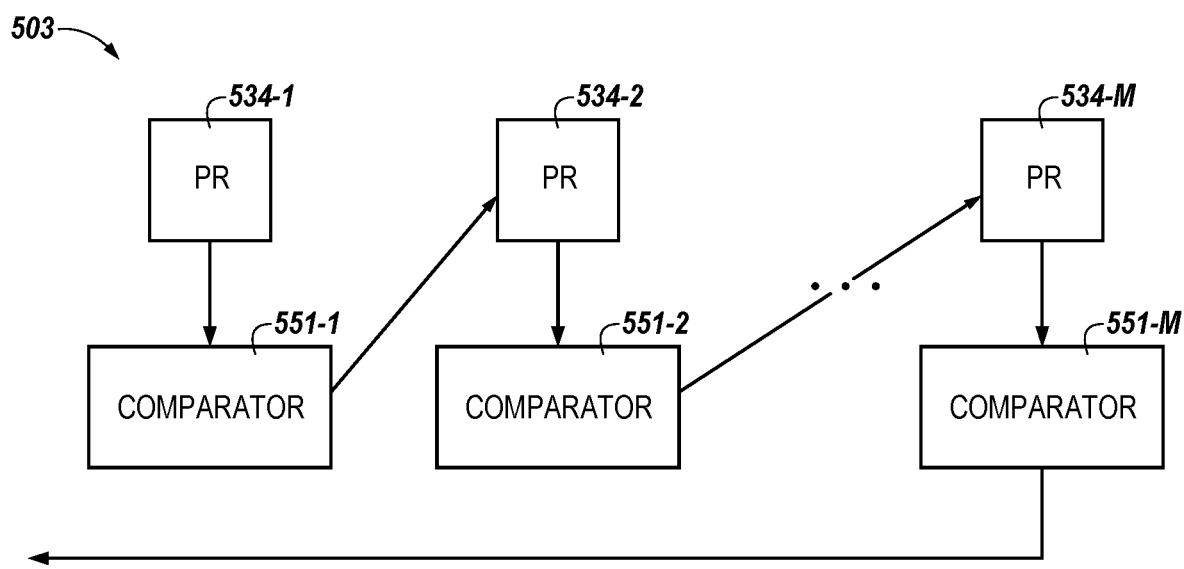
FIG. 5 is a block diagram of an apparatus in the form of a memory device including a plurality of processing resources and comparators in accordance with a number of embodiments of the present disclosure.

FIG. 5 is a block diagram of an apparatus in the form of a memory device 503 including a plurality of processing resources 534-1, 534-2, . . . , and 534-M and comparators 551-1, 551-2, . . . , 551-M in accordance with a number of embodiments of the present disclosure. The processing resources 534-1, 534-2, . . . , and 534-M can be referred to as processing resources 534 and the comparators 551-1, 551-2, . . . , 551-M can be referred to as comparators 551.

The processing resources 534 can perform a number of processes. The processing resources can be coupled to the comparators 551. For example, the processing resource 534-1 is coupled to the comparator 551-1, the processing resource 534-2 is coupled to the comparators 551-2, . . . , and the processing resource 534-M is coupled to the comparator 551-M. The processing resources 534 can provide the results of the processes to the comparators 551. The comparators 551 can comprise circuitry configured to compare a value provide by the processing resources 534 to threshold values.

For example, the comparator 551-1 can compare values provided by the processing resource 534-1 to a first threshold value. The comparator 551-2 can compare values provided by the processing resource 534-2 to a second threshold value. The comparator 551-M can compare values provided by the processing resource 534-M to an Mth threshold value. Responsive to determining that the values provided by the processing resources 534 are greater than, equal to, or less than a threshold value, the comparators 551 can provide a signal to a corresponding processing resource. For example, the comparator 551-1 can provide a signal to the processing resource 534-2 responsive to the values provided by the processing resource 534-1 being greater than a threshold value.

The comparators 551 can receive inputs, integrate the inputs, and provide an output (e.g., fire). For example, the comparators 551 can receive a plurality of inputs including a first charge and a second charge. The first charge and the second charge can be combined (e.g., integrated) to generate a third charge. The integrated charges can degrade (e.g., leak) over time. For example, the charges stored by a capacitor of the comparator 551 can degrade over time. The comparators 551 can include a resistor and a capacitor, among other components. The resistor and the capacitor can also be referred to a resistor-capacitor (RC) circuit. The capacitor of the comparator 551 can combine charges such that charges that are received at the capacitor. The capacitor can provide a combined charge to circuitry configured to provide a forward spike.

The processing resources 534 can be activated a plurality of times such the results of the process are retained by the comparator 551 until a threshold is reached. Determining whether a threshold is reached comprises comparing multiple values. The comparator 551 can provide a signal (e.g., forward spike) to a corresponding processor. Retaining results does not include storing because the values retains are constantly changing given the degradation of the retained results.

In some examples, the processing resources 534 and/or the comparators 551 can function without reference to a clock signal. For instance, the processing resource 534 and the comparator 551 can function without reference to a clock signal. Although the processing resources 534 and the comparators 551 are shown as two separate components, the processing resources 534 and the corresponding comparators 551 can comprise a single component. For example, the processing resource 534-1 and the comparator 551-1 can comprise a single device.

In various instances, the comparators 551 can provide signals to different processing resources based on the results of the processes performed by one or more processing resources. the processing resources. For example, a comparator can provide a first signal to a first processing resource if a value is less that a first threshold, a second signal to a second processing resource if the value is greater than the first threshold but less than a second threshold, or a third signal to a third processing resource if the value is greater than a third threshold, among other possible implementation of mappings between thresholds and processing resources.

Figure 6:
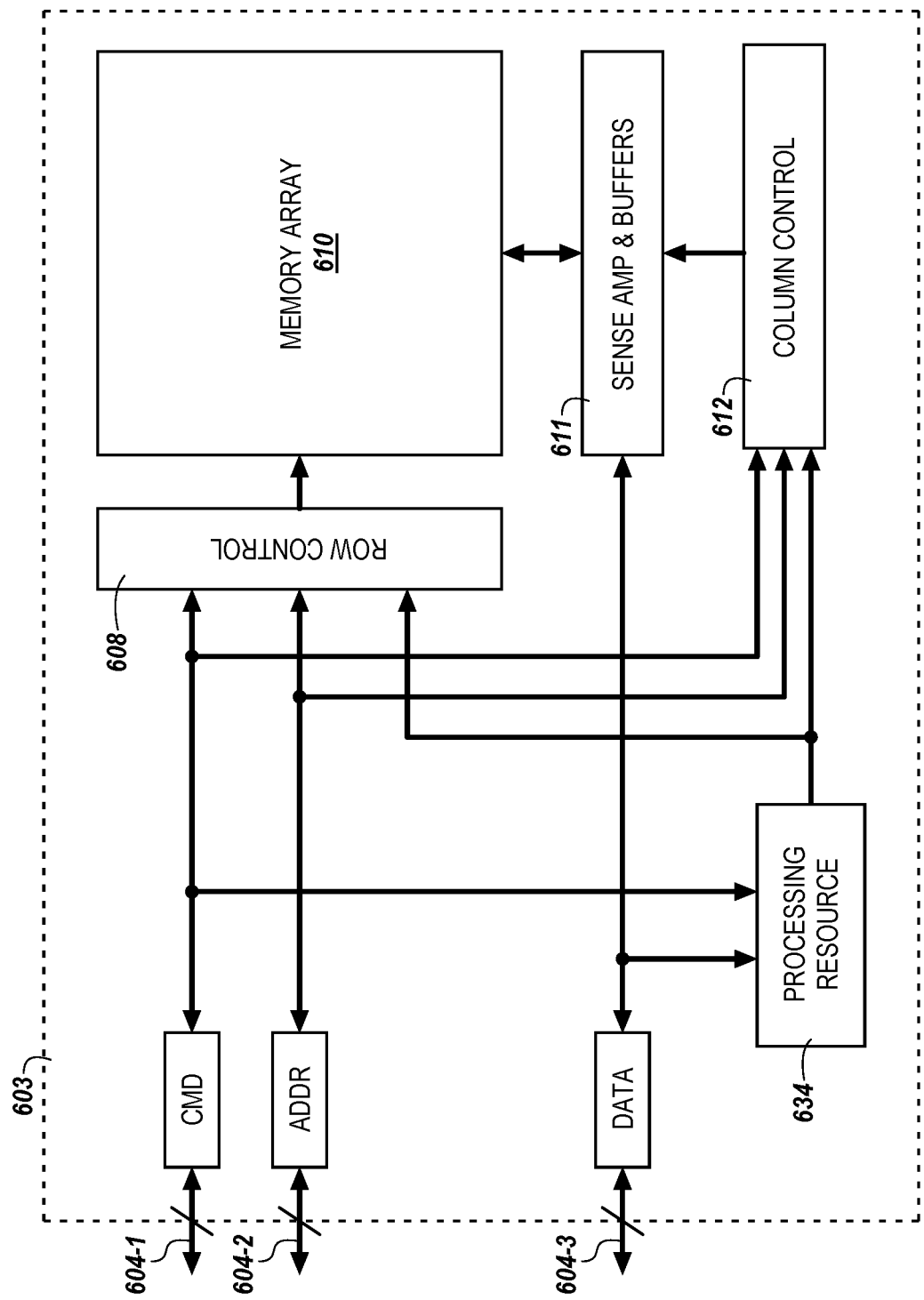
FIG. 6 is a block diagram an apparatus in the form of a memory device including a processing resource in accordance with a number of embodiments of the present disclosure.

FIG. 6 is a block diagram of an apparatus in the form of a memory device 603 including a processing resource 634 in accordance with a number of embodiments of the present disclosure. The processing resource 634 of FIG. 6 is shown as being coupled to the data lines. Although the processing resource 634 is shown as a single processing resource, the processing resource 634 can represent a number of processing resources such as the processing resources 334 in FIG. 3. The processing resource 634 represents the combination of a processing resource and a comparator.

The processing resource 634 can be coupled to the command interface 604-1 and the command interface 604-3. Although not shown, the processing resource 634 can also be coupled to the address interface 604-2. The processing resource 634 can receive command via the command interface 604-1. The commands received by the processing resource 634 can be utilized to program the processing resource 634 to perform the various functions described herein.

The processing resource 634 can activate a row control 608 and/or a column control 612 in addition to activating different processing resources. The row control 608 and the column control 612 can be activated to provide data values from the memory cells of memory array 610 to the sense amplifiers 611 and from the sense amplifiers 611 to a corresponding processing resource. The memory cells can store weights of an artificial neural network such as activating the row control 608 and/or the column control 612 can provide weights to the corresponding processing resource for the performance of corresponding processes.

In various examples, the processing resource 634 can receive and/or output data through the data interface 604-3. Given that the processing resource 634 can output a result which is the results of the performance of a plurality of processes which may in part be asynchronous, the processing resource 634 may not be able to provide the result synchronously with the expectation of the result by a host. To overcome the challenge of providing a result through the data interface 604-3 while the host is expecting the result, the processing resource 634 may hold the result until a synchronous delivery of data is scheduled. The processing resource 634 may provide the result after different data is synchronously provided through the data interface 604-3.

For example, a command to perform the plurality of processes that are asynchronous can be received by the memory device 603 through the command interface 604-1 and/or the address interface 604-2. The plurality or processes can be performed and the result can be generated by the processing resource 634. Independent of the command to perform the plurality of processes, the memory device 603 can receive a command to perform a plurality of operations and/or processes that are synchronous. For example, the read command can be received by the command interface 604-1 and an address corresponding to the read command can be received by the address interface 604-2. The memory device can output data read from memory cells having the address via the data interface 604-3 twenty to twenty two clock cycles after the read command is received by the memory device 603. After the data read is provided, the processing resource 634 can provide the result via the data interface 604-3.

However, providing a result of the processes after the data is read from the memory array 610 may not be compliant with a standard interface protocol but may be compliant with a particular interface protocol. Defining different interface protocols can be different than repurposing a pin utilizing a single interface protocol. For example, an interface protocol can provide for pins that are "open." An open pin describes a pin that can be used to provide signals that are not defined by the interface protocol. However, providing a signal such as a command through an open pin does not make the interface protocol noncompliant with itself when an address is provided through the open pin. The interface protocol continues to be compliant with itself when different types of signals are provided through an open pin because the pin is open. However, redefining each of the pins can result in a different interface protocol being noncompliant with each other.

As used herein, compliance describes the ability to decode signals received through each of the pins utilizing a first interface protocol or a second interface protocol without losing functionality. Compliance can also include encoding signals utilizing a first interface protocol or a second interface protocol without degrading data encoded through the signals. For example, if a host provides a signal representing a read command through a particular pin to the memory device 603 using a first interface protocol, and the memory device decodes the signal as a write command utilizing a second interface protocol, then the first interface protocol is noncompliant with the second interface protocol. Decoding a single signal as anything other than what it was encoded to be can result in noncompliance between the interface protocol used to encode the signal and the interface protocol used to decode the signal with the exception of signals provided via an open pin.

Implementing a noncompliant interface protocol can also provide the ability to output data at different times as compared to the outputting of data utilizing a compliant interface protocol. The command to perform asynchronous operations can be received while the memory device 603 is in a mode corresponding to the noncompliant interface protocol. The outputting of the results of the asynchronous processes can be provided while the memory device 603 is in a noncompliant interface protocol.

The host can be configured to receive data responsive to providing a read command to the memory device 603 while in a compliant mode. The host can also be configured to receive a result of a plurality of asynchronous processes while in a noncompliant mode. The host can "listen" after receipt of scheduled data to receive data that is not scheduled. As used herein, scheduled data describes the providing and/or receiving data at an expected time. Nonscheduled data describes the providing and/or receiving data at a time that is not expected.

Figure 7:
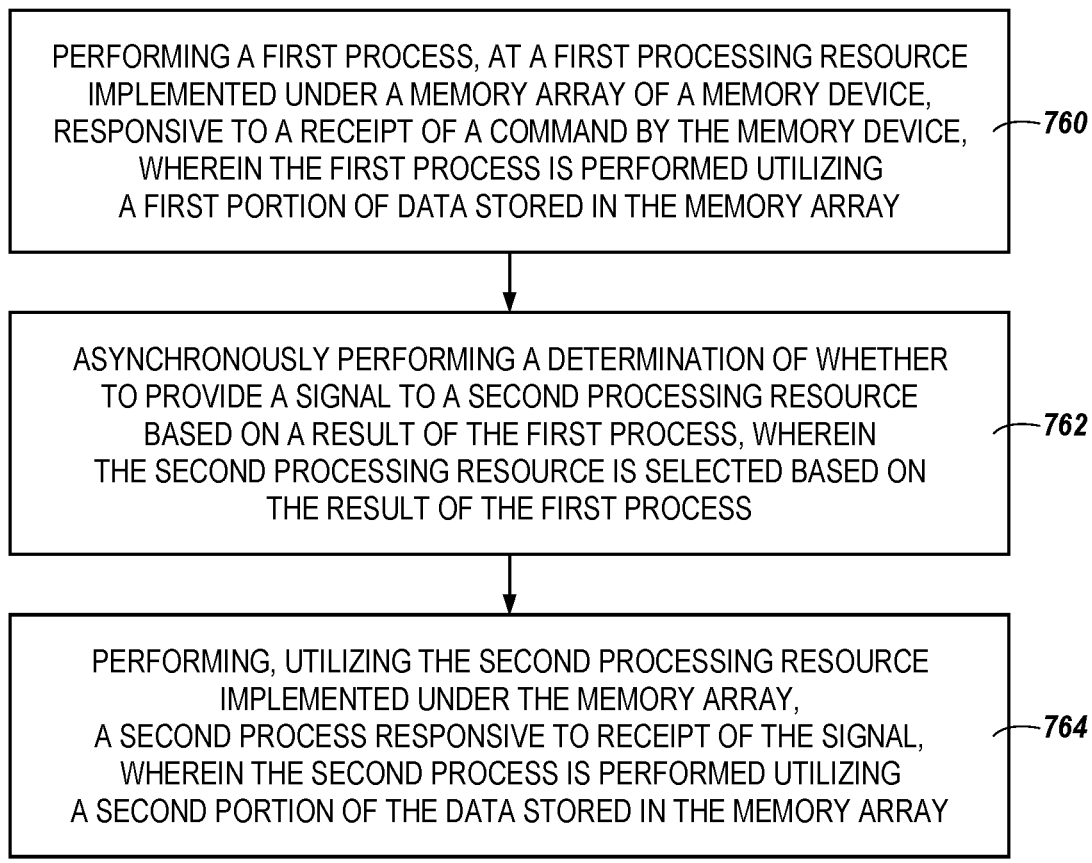
FIG. 7 illustrates an example flow diagram of a method for performing operations in memory in accordance with a number of embodiments of the present disclosure.

FIG. 7 illustrates an example flow diagram of a method for performing operations in memory in accordance with a number of embodiments of the present disclosure. At 760, a first process can be performed, as a first processing resource implemented under a memory array of a memory device, responsive to a receipt of a command by the memory device, wherein the first process is performed utilizing a first portion of data stored in the memory array. At 762, a determination can be asynchronously performed. The determination can determine whether or not to provide a signal to a second processing resource based on a result of the first process, wherein the second processing resource is selected based on the result of the first process. At 764, a second process can be performed utilizing the second processing resource implemented under the memory array. The second process can be performed responsive to receipt of the signal. The second process can be performed utilizing a second portion of the data stored in the memory array.

The method can also include asynchronously performing the determination utilizing logic (e.g., comparator) configured to compare the result to a plurality of thresholds. Each of the plurality of thresholds can be associated with the selection of a different processing resource including the second processing resource. For example, if the result is less than a first threshold, then the comparator can provide a signal to a third processing resource, if the result is greater than the first threshold but less than a second threshold, then the comparator can provide a signal to a fourth processing resource.

The logic that functions asynchronously to a clock signal of the host device can be coupled to the first processing resource. The first processing resource can provide the result to the logic. The logic can be implemented under the memory array. For example, the memory array can be implemented in a first hardware layer of the memory device and the processing resource and/or the logic can be implemented in a second hardware layer of the memory array.

The logic can couple processing resources which provides a topology between the processing resources. For example, the first processing resource can be selectively coupled to the plurality of processing resources including the second processing resource via the logic that functions asynchronously to the clock signal of the host device. In various instances the processing resource can be selectively coupled to a different processing resource as opposed to a plurality of processing resources via the logic.

The processing resource can be selectively coupled to a plurality of processing resources via one or more instance of the logic. For example, the processing resource can provide the result to a plurality instances of the logic. Each instance of the logic can be configured to couple the processing resource to a different processing resource. For example, a first instance of a logic can be configured to couple the first processing resource to a second processing resource if the result is greater than a first threshold value. A second instance of a logic can be configured to couple the first processing resource to a third processing resource if the result is greater than a second threshold value and so forth. The first threshold value and the second threshold value can be equal or can be different. Implementing different instances of the logic provide for the selection of the topology between processing resources based on the results of the processes.

In various examples, a processing resource providing a result can be selectively coupled to a plurality of different processing resources. A processing resource receiving signals can also be selectively coupled to a plurality of different processing resources providing the signals through a plurality of instance of the logic (comparators). The results of the process performed by the processing resource can be provided under the memory array to the logic. The logic can provide a signal to the processing resources, responsive to the result being larger or smaller than a threshold, under the memory array.

The logic can operate asynchronously regardless of whether or not the first processing resource and the second processing resource operate asynchronously to the clock signal of the host device. For example, the processing resources may operate synchronously while the logic operates asynchronously to the clock signal of the host device. As used herein, the processing resources and/or logic can function asynchronously from a control signal and/or a clock signal of a host device. References to synchronicity are in the context of control signals.

The second processing resource can be configured to perform the second process without receipt of additional signals by the apparatus. For example, the host can provide a first command which can be used to initiate performance of the first process by the first processing resource. The result of the first process can be used to initiate a second process which is performed by a second processing resource. The second process can be initiated without the host providing additional commands and/or signals.

The memory device can export the result of the first process and a result of the second process on an interface coupling the apparatus to a host during operation of another command. The operation of another command can include reading data from the memory array and providing the data to the host. During the providing of the data from the memory device to the host responsive to receipt of a read command, the memory device can provide the result of the first process and the second process. For example, the results can be provided after the data is read and provided to the host.

The results of the first process and the second process can be provided (e.g., exported) during the operation of the apparatus in a non-compliant mode. In a compliant mode, the results of the first process and/or the second process can be stored to one or more memory array to which the processing resources performing the first process and the second process are coupled to.

Figure 8:
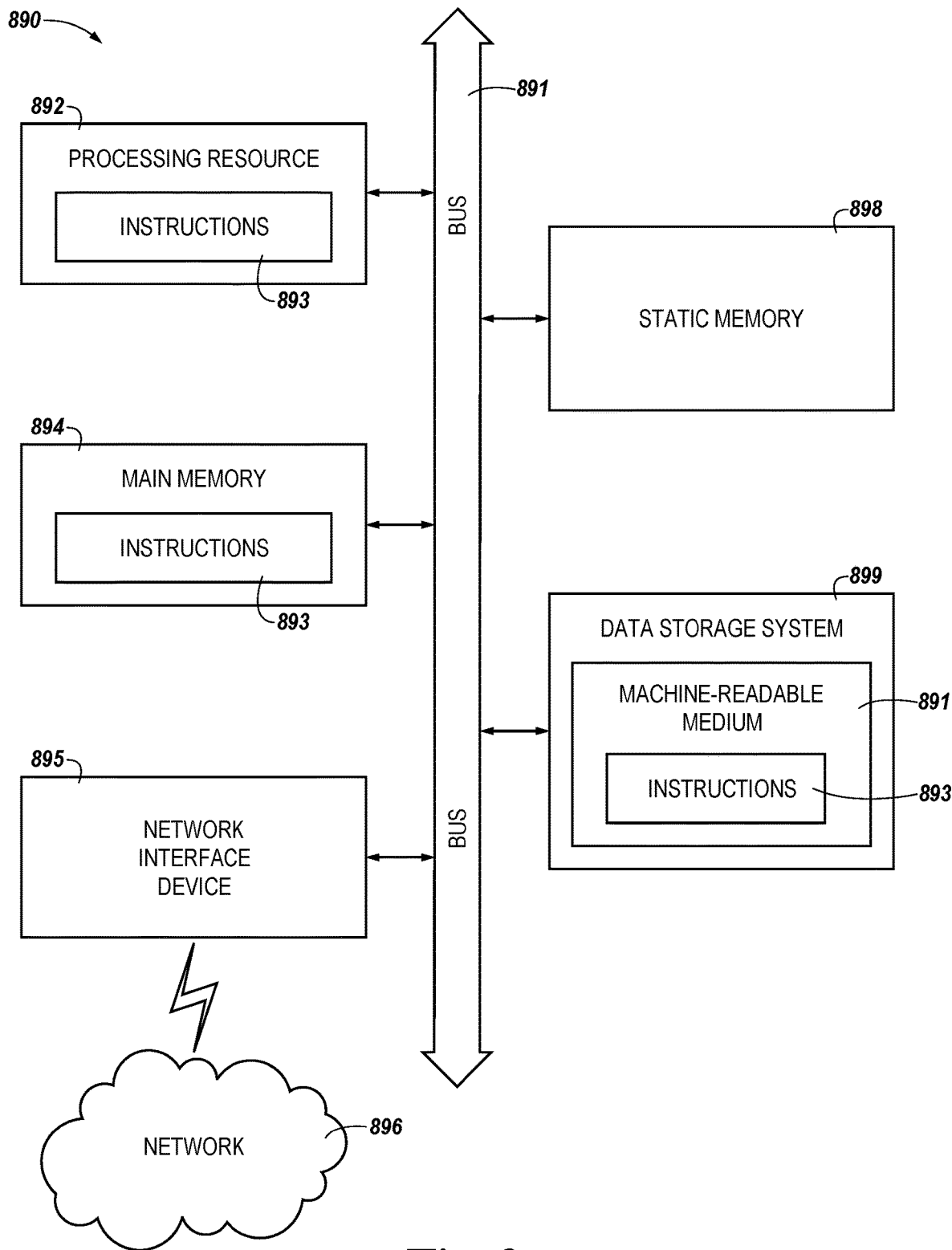
FIG. 8 illustrates an example machine of a computer system within which a set of instructions, for causing the machine to perform various methodologies discussed herein, can be executed.

FIG. 8 illustrates an example machine of a computer system 890 within which a set of instructions, for causing the machine to perform various methodologies discussed herein, can be executed. In various embodiments, the computer system 890 can correspond to a system (e.g., the system 100 of FIG. 1) that includes, is coupled to, or utilizes a memory sub-system (e.g., the memory device 103 of FIG. 1) or can be used to perform the operations of a controller (e.g., the controller circuitry 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 890 includes a processing resource 892, a main memory 894 (e.g., read-only memory (ROM), flash memory, dynamic random access memory (DRAM) such as synchronous DRAM (SDRAM) or Rambus DRAM (RDRAM), etc.), a static memory 898 (e.g., flash memory, static random access memory (SRAM), etc.), and a data storage system 899, which communicate with each other via a bus 897.

Processing resource 892 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing resource 892 can also be one or more special-purpose processing devices such as an application specific integrated circuit (ASIC), a field programmable gate array (FPGA), a digital signal processor (DSP), network processor, or the like. The processing resource 892 is configured to execute instructions 893 for performing the operations and steps discussed herein. The computer system 890 can further include a network interface device 895 to communicate over the network 820.

The data storage system 899 can include a machine-readable storage medium 891 (also known as a computer-readable medium) on which is stored one or more sets of instructions 893 or software embodying any one or more of the methodologies or functions described herein. The instructions 893 can also reside, completely or at least partially, within the main memory 894 and/or within the processing resource 892 during execution thereof by the computer system 890, the main memory 894 and the processing resource 892 also constituting machine-readable storage media.

In one embodiment, the instructions 893 include instructions to implement functionality corresponding to the host 102 and/or the memory device 103 of FIG. 1. While the machine-readable storage medium 891 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory array configured to store data and to function synchronously with a clock signal received from a host device;
    a processing resource, implemented in hardware, coupled to the memory array and configured to:
        execute a first process utilizing the data stored by the memory array responsive to a receipt of a signal by the apparatus, wherein the first process comprises a first layer of an artificial neural network;
        determine asynchronously, without reference to a plurality of clock signals including the clock signal of the host device, that a result of the first process is greater than a threshold value; and
        execute a second process, comprising logical operations, on the data responsive to the determination that the result of the first process is greater than the threshold value,. wherein the second process comprises a second layer of the artificial neural network;
    wherein the second process is initiated without the host device providing an additional command.

2. The apparatus of claim 1, wherein the processing resource is configured to perform the first process asynchronously with the clock signal of the host device.

3. The apparatus of claim 1, the processing resource is further configured to perform the first process and the second process asynchronously with the clock signal of the host device.

4. The apparatus of claim 1, wherein the processing resource is further configured to perform a third process responsive to a determination that the result is greater than a different threshold value.

5. The apparatus of claim 1, wherein the processing resource is further configured to refrain from executing the second process responsive to a determination that the result is not greater than the threshold value.

6. The apparatus of claim 1, further comprising an input/output (I/O) circuitry configured to provide a result of the second process asynchronously with the clock signal of the host device.

7. A method comprising:
    performing a first process, at a first processing resource implemented under a memory array of a memory device, responsive to a receipt of a command by the memory device, wherein the first process is performed utilizing a first portion of data stored in the memory array, and wherein the first processing resource comprises as a first layer of an artificial neural network;
    performing a determination of whether to provide a signal to a second processing resource based on a result of the first process;
    selecting the second processing resource from a plurality of processing resources based on the result of the first process; and
    performing, utilizing the second processing resource implemented under the memory array, a second process responsive to a receipt of the signal, wherein the second process is performed utilizing a second portion of the data stored in the memory array, and wherein the second processing resource comprises as a second layer of the artificial neural network;
    wherein the second process is initiated without a host device providing an additional command.

8. The method of claim 7, further comprising asynchronously performing the determination utilizing comparator logic implemented in hardware and configured to compare the result to a plurality of thresholds, wherein each of the plurality of thresholds is associated with the selection of a different processing resource including the second processing resource.

9. The method of claim 8, wherein the comparator_logic, that functions asynchronously, is coupled to the first processing resource and wherein the method further comprises providing the result of the first process to the comparator logic.

10. The method of claim 8, further comprises providing signals between the first processing resource and the plurality of processing resources including the second processing resource via the comparator logic that functions asynchronously to a clock signal of the host device.

11. The method of claim 10, further comprising selectively coupling the first processing resource to the second processing resource via the comparator logic that functions asynchronously to the clock signal of the host device.

12. The method of claim 10, further comprising selectively coupling the first processing resource to the plurality of processing resources via one or more instances of the comparator_logic that functions asynchronously to the clock signal of the host device.

13. The method of claim 10, further comprising selectively coupling the second processing resource to the first processing resource and the plurality of processing resource via one or more instances of the comparator_that functions asynchronously to the clock signal of the host device.

14. The method of claim 10, further comprising operating the comparator logic asynchronously regardless of whether the first processing resource and the second processing resource operate asynchronously to the clock signal of the host device.

15. The method of claim 8, wherein the comparator_logic is implemented under the memory array and further comprising providing the signal under the memory array to the second processing resource.

16. An apparatus comprising:
a first memory array implemented in a first layer of a memory device;
a second memory array implemented in the first layer of the memory device;
a first processing resource implemented in a second layer of the memory device under the first memory array and configured to perform a first process utilizing a first data value from the first memory array;
a comparator implemented in the second layer of the memory device and coupled to the first processing resource and a second processing resource and configured to provide a signal to the second processing resource based on a result of the first process; and
wherein the first processing resource comprises as a first artificial neural network; and
the second processing resource implemented in the second layer of the memory device under the second memory array and configured to perform a second process utilizing a second data value from the second memory array;
wherein the second processing resource is configured to perform the second process responsive to a receipt of the signal from the comparator; and
wherein the second processing resource comprises as a second artificial neural network; and
wherein the second process is initiated without a host device providing an additional command.

17. The apparatus of claim 16, wherein the second processing resource is configured to perform the second process without a receipt of an additional signal by the memory device.

18. The apparatus of claim 16, wherein the first memory array, the second memory array, the first processing resource, and the second processing resource function synchronously utilizing a clock signal of the host device.

19. The apparatus of claim 16, wherein the apparatus is further configured to export the result of the first process and a result of the second process on an interface coupling the apparatus to the host device during operation of another command.

20. The apparatus of claim 19, wherein the apparatus is configured to export the result of the first process and the result of the second process during operation of the memory device in a non-compliant mode and is further configured to store the result of the first process and the result of the second process to the first memory array or the second memory array during operation of the memory device in a compliant mode.

* * * * *